United States Patent [19]

Runkle et al.

[11] Patent Number: 4,512,445

[45] Date of Patent: Apr. 23, 1985

[54] ADJUSTMENT ASSEMBLY FOR A DISC BRAKE

[75] Inventors: Dean E. Runkle, LaPorte; James J. Colpaert, Granger, both of Ind.

[73] Assignee: The Bendix Corporation, Southfield, Mich.

[21] Appl. No.: 413,857

[22] Filed: Sep. 1, 1982

[51] Int. Cl.³ .............................................. F16D 65/56
[52] U.S. Cl. ................................. 188/71.9; 188/196 D
[58] Field of Search .................. 188/71.8, 71.9, 106 F, 188/196 BA, 196 D, 196 F

[56] References Cited

U.S. PATENT DOCUMENTS 4,056,173  11/1977  Farr ............................. 188/196 D X
4,246,985  1/1981  Shimizu et al. ............ 188/196 D X Primary Examiner—Duane A. Reger
Attorney, Agent, or Firm—Paul David Schoenle; Ken C. Decker

[57] ABSTRACT

An adjustment assembly for a disc brake includes a nut (26) and a threaded stem (28). The threaded stem (28) defines a first diameter portion (72) and a second diameter portion (76) which cooperate to form a differential area sealingly engaging an inwardly extending partition (68). The partition (68) also forms a passage (88) to communicate fluid pressure to both portions (72, 76) so that the differential area and pressure communicating passage are compactly arranged at the partition (68).

4 Claims, 1 Drawing Figure

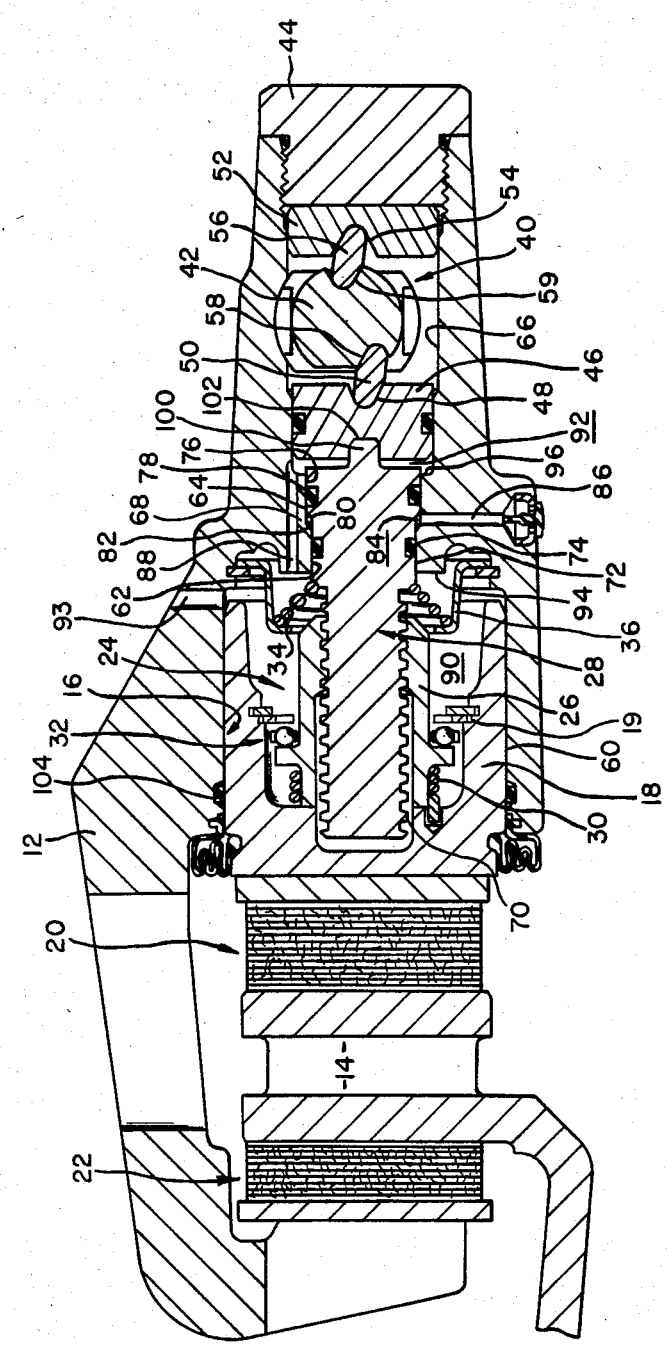

ADJUSTMENT ASSEMBLY FOR A DISC BRAKE

This invention relates to an adjustment assembly for a disc brake wherein a caliper assembly includes a piston which cooperates with the caliper assembly to urge a pair of friction elements into engagement with a rotor. The adjustment assembly is operable to maintain the piston closely adjacent one of the pair of friction elements.

An adjustment assembly for a disc brake wherein a caliper includes a stepped bore for receiving a piston, the adjustment assembly comprising a nut cooperating with the piston to limit retraction of the latter upon termination of braking and a threaded stem cooperating with the nut to limit retraction of the nut, the nut being adjustable relative to the threaded stem upon initial braking when the fluid pressure communicated to the caliper is below a predetermined value and the threaded stem being pressure responsive to the fluid pressure communicated to the caliper to substantially limit adjustment of the nut relative to the threaded stem when the fluid pressure communicated to the caliper is above the predetermined value.

The prior art adjustment assemblies utilize a plurality of parts to form the differential area which is exposed to fluid pressure within the caliper. Consequently, it is desirable to provide an adjustment assembly with fewer parts. Also, the prior art locates the differential area at sufficiently spaced axial locations thereby adding to the length of the caliper. Consequently, it is also desireable to shorten the spacing of the differential area to provide a shorter adjustment assembly.

The present invention is characterized in that said stepped bore defines a first diameter portion sealingly engaging said threaded stem and a second diameter portion sealingly engaging said threaded stem, said second diameter portion being larger than said first diameter portion whereby fluid pressure acting against said threaded stem above the predetermined level biases said threaded stem to move toward said piston, said threaded stem cooperating with said stepped bore to define a chamber between said sealing engagements and vented to atmosphere and said caliper or threaded stem defining a passage remote from said chamber for communicating fluid pressure acting against said threaded stem at said first diameter portion to said second diameter portion for acting against said threaded stem at said second diameter portion.

It is an advantage of the present invention that the threaded stem forms both the first and second areas to define the differential area and both the first and second areas are sealingly engageable with the caliper bore at substantially one location.

The invention will now be described with reference to the sole drawing wherein a disc brake assembly is shown in cross section with an adjustment assembly constructed in accordance with the present invention.

The disc brake assembly 10 includes a caliper housing 12 extending over a portion of a rotor 14. The caliper housing forms a bore 16 for movably receiving a piston 18 and the piston is movable in response to fluid pressure communicated to the bore 16 to urge a first friction element 20 directly into engagement with the rotor 14 so that the caliper housing is movable to urge a second friction element 22 into engagement with the rotor 14.

The piston 18 is substantially U-shaped in cross section to receive an adjustment assembly 24 comprising a nut 26 opposing the piston 18, a threaded stem 28 cooperating with the nut to control the position of the nut within the bore 16, and a one way clutch spring 30 permitting rotation of the nut on the threaded stem 28 in one direction only. The clutch spring does not impart rotation to the threaded stem. A thrust bearing assembly 32 between the nut 26 and the piston 18 cooperates with a retainer 19 and biases the nut to move with the piston during braking after the clearance is taken up. If the piston travel is larger than normal, the thrust bearing will cause the nut 26 to rotate on the threaded stem to an adjusted position. A spring 34 extends between a seat 36 and the threaded stem 28 to bias the latter to its rest position within the bore 16.

A mechanical actuator 40 includes a cam shaft 42 extending through the bore 16 opposite the piston 18. A plug 44 closes one end of the bore 16. A spacer 46 abuts the threaded stem 28 and includes a recess 48 for receiving a first toggle 50, while a disc 52 adjacent the plug 44 includes a recess 54 for receiving a second toggle 56. The cam shaft is provided with a pair of recesses 58 and 60 receiving the respective toggles 50 and 56. Consequently, rotation of the cam shaft in a clockwise direction will bias the spacer to move toward the rotor 14 to move the piston via the nut and threaded stem.

The caliper bore 16 includes an enlarged diameter portion 60 receiving the piston 18, a first diameter portion 62 engaging the threaded stem 28, a second diameter portion 64 larger than the first diameter portion 62 but also engaging the threaded stem 28, and a third diameter portion 66 receiving the mechanical actuator. The first and second diameter portions, 62 and 64, are formed by a radially inwardly extending partition 68 formed integrally by the caliper housing 12.

In accordance with the invention, the threaded stem 28 forms a threaded portion 70 cooperating with the nut 26, a first diameter portion 72 with a seal 74 engaging the first diameter portion 62 of bore 16, and a second diameter portion 76 with a seal 78 engaging the second diameter portion 64 of bore 16. The step 80 between portions 72 and 76 of the threaded stem 28 faces the step 82 between portions 62 and 64 of the bore 16 to define a chamber 84 which is vented to atmosphere via radial port 86. An axially extending passage 88 extends from a primary pressure chamber 90 to a secondary reaction chamber 92 so that fluid pressure communicated to the primary pressure chamber 90 via inlet port 93 is also communicated to the secondary reaction chamber 92 via passage 88. The passage 88 intersects a caliper housing shoulder 94 between bore portions 60 and 62 and extends to a caliper housing shoulder 96 between bore portions 64 and 66.

The threaded stem 28 forms smooth diameter portions 72 and 76 to define a differential area which is in communication with the fluid pressure communicated to the chambers 90 and 92. It follows that the threaded stem will move toward the rotor 14 when the fluid pressure within the chambers is sufficient to overcome the force of spring 34. With the structure provided by the invention herein, the differential area is compactly contained within the radially inwardly extending partition 68 which also locates the passage 88 for communicating the chambers 90 and 92 with each other.

In order to prevent the threaded stem from rotating in the housing bore, a projection 100 extends from the threaded stem opposite the piston 18 to fit within an associated recess 102 on the spacer 46. Since the spacer 46 is prevented from rotation by the toggle 50 and the projection-recess connection forms a locking fit such as with a square projection and square recess, the threaded stem remains rotationally fixed within the bore 16.

During a braking application, fluid pressure is communicated to the chamber 90 and the chamber 92 via passage 88. The fluid pressure in chamber 90 acts against the piston 18 to move the latter toward the rotor 14. If the spacing between the friction element 20 and the rotor 14 is greater than the spacing at the thrust bearing assembly 32, the thrust bearing will take up the spacing with the nut 26 to bias the latter toward the rotor. Consequently, the nut 26 will rotate on the threaded stem to an adjusted position. When the fluid pressure level in chambers 90 and 92 reaches a predetermined value, the differential area on the threaded stem is exposed to the pressure to move the threaded stem toward the rotor 14, after the piston 18 has moved, so that the thrust bearing assembly will reestablish a spacing with the retainer 19 to prevent further rotation of the nut 26 on the threaded stem 28. Upon termination of braking, the fluid pressure within chambers 90 and 92 is reduced so that the spring 34 returns the threaded stem to its rest position abutting the spacer 46 and the piston 18 is returned to its rest position by the retraction seal 104. If the nut 16 has been rotated on the threaded stem during the brake application, the piston 18 will return to abut the nut at an adjusted position so that a small spacing will be maintained between the friction element 20 and the rotor even though the friction element is worn to a smaller thickness than when originally installed.

During a parking brake application, the cam shaft 42 is rotated clockwise so that both toggles are pivoted toward a substantially axially extending position to move the spacer 46 toward the rotor 14. The moving spacer 46 pushes the threaded stem toward the rotor which, in turn, moves the nut 26 and the piston 18 toward the rotor. The arc swing of the reaction toggle 56 also tends to move the cam shaft towards the disc. As is well known in the art, the friction element 20 engages the rotor to generate a reaction force on the caliper housing so that the latter moves in the opposite direction to the piston movement to urge the friction element 22 into engagement with the rotor 14. Because the threaded stem and nut initially move the piston during the parking brake application, no adjustment takes place during the parking brake application.

We claim:

1. An adjustment assembly for a disc brake wherein a caliper includes a stepped bore for receiving a piston, the adjustment assembly comprising a nut cooperating with the piston to limit retraction of the latter upon termination of braking and a threaded stem cooperating with the nut to limit retraction of the nut, the nut being adjustable relative to the threaded stem upon initial braking when the fluid pressure communicated to the caliper is below a predetermined value and the threaded stem being pressure responsive to the fluid pressure communicated to the caliper to substantially limit adjustment of the nut relative to the threaded stem when the fluid pressure communicated to the caliper is above the predetermined value, characterized in that said stepped bore defines a first diameter portion sealingly engaging said threaded stem and a second diameter portion sealingly engaging said threaded stem, said second diameter portion being larger than said first diameter portion whereby fluid pressure acting against said threaded stem above the predetermined level biases said threaded stem to move toward said piston, said threaded stem cooperating with said stepped bore to define a chamber between said sealing engagements and vented to atmosphere and said caliper or threaded stem defining a passage remote from said chamber for communicating fluid pressure acting against said threaded stem at said first diameter portion to said second diameter portion for acting against said threaded stem at said second diameter portion.

2. The adjustment assembly of claim 1 in which a spacer sealingly engages said caliper stepped bore adjacent said second diameter portion to enclose one end of said threaded stem within a reaction chamber communicating with said passage.

3. The adjustment assembly of claim 2 in which said spacer sealingly engages said stepped bore at a third diameter portion adjacent said second diameter portion, said second and third diameter portion cooperating to define a shoulder thru between and said passage intersects said shoulder.

4. The adjustment assembly of claim 1 in which said caliper defines a radially inwardly extending partition with a central opening defining said first and second diameter portions, said partition separating an enlarged diameter portion of said bore from a third diameter portion of said bore, said enlarged diameter portion receiving said piston, said third diameter portions receiving a mechanical actuator which is operable to move the threaded stem and nut toward said piston and said radially inwardly extending partition defining said passage, said first diameter portion, and said second diameter portion whereby a differential area for said stem is disposed in axial alignment with said radially inwardly extending partition.

* * * * *